(12) United States Patent
Van Gundy et al.

(10) Patent No.: US 11,504,644 B2
(45) Date of Patent: Nov. 22, 2022

(54) CLOSED LOOP EXTRACTION SYSTEM

(71) Applicant: Colorado Extraction Systems, LLC, Wheat Ridge, CO (US)

(72) Inventors: Quinton Lane Van Gundy, Aurora, CO (US); Michael David Allen, Superior, CO (US)

(73) Assignee: Colorado Extraction Systems, LLC, Wheat Ridge, CO (US)

( * ) Notice: Subject to any disclaimer, the term of this patent is extended or adjusted under 35 U.S.C. 154(b) by 223 days.

(21) Appl. No.: 16/946,737

(22) Filed: Jul. 2, 2020

(65) Prior Publication Data
US 2022/0001299 A1 Jan. 6, 2022

(51) Int. Cl.
| | |
|---|---|
| *B01D 11/02* | (2006.01) |
| *B01D 21/26* | (2006.01) |
| *B04B 3/00* | (2006.01) |
| *B04B 11/04* | (2006.01) |
| *C11B 1/10* | (2006.01) |

(52) U.S. Cl.
CPC ...... *B01D 11/0284* (2013.01); *B01D 11/0273* (2013.01); *B01D 11/0296* (2013.01); *B01D 21/262* (2013.01); *B04B 11/04* (2013.01); *C11B 1/108* (2013.01); *B01D 11/0203* (2013.01); *B04B 3/00* (2013.01)

(58) Field of Classification Search
CPC ............ B01D 11/0284; B01D 11/0273; B01D 11/0296; B01D 11/0203; B01D 11/0288; B01D 11/0292; B01D 11/0207; B01D 17/0217; B01D 21/26; B01D 21/262; B01D 29/11; B01D 29/114; B01D 29/117; B01D 36/00; B01D 37/00; C11B 1/02; C11B 1/10; C11B 1/104; C11B 1/108; C11B 3/001; C11B 3/006; C11B 3/008; C11B 3/16; B04B 3/00; B04B 3/06; B04B 11/04; B04B 15/02; B04B 15/12

See application file for complete search history.

(56) References Cited

U.S. PATENT DOCUMENTS

| | | | | |
|---|---|---|---|---|
| 3,929,411 | A * | 12/1975 | Takano | G01N 35/1097 141/54 |
| 6,172,031 | B1 * | 1/2001 | Stevens | C11D 3/2093 510/505 |
| 2016/0279535 | A1 * | 9/2016 | Jones | A61K 36/185 |
| 2019/0046998 | A1 * | 2/2019 | Stephens | B01D 11/0269 |

(Continued)

OTHER PUBLICATIONS

CAPNA Systems, Equipment, website, USA, URL: https://capnasystems.com/equipment.

(Continued)

*Primary Examiner* — Joseph W Drodge
(74) *Attorney, Agent, or Firm* — MG Miller Intellectual Property Law LLC (57) ABSTRACT

A closed loop extraction system for extracting desired components from raw plant matter and method of use is disclosed. The closed loop extraction system features a solvent source, a chill tank, a wash tank, a rinse tank, a centrifuge, and a feed tank all in fluid communication via a series of interconnected pump systems. The method of extracting the desired products from raw plant matter uses this system to perform the extraction with a reduced amount of solvent in an energy-efficient manner.

20 Claims, 3 Drawing Sheets

(56) References Cited

U.S. PATENT DOCUMENTS

| | | | | |
|---|---|---|---|---|
| 2019/0151771 A1* | 5/2019 | Thomas | ............... | B01D 5/0072 |
| 2019/0366230 A1* | 12/2019 | Casals | .................... | B01D 15/08 |
| 2020/0237840 A1* | 7/2020 | Morrow | ............... | A23L 27/115 |
| 2020/0269154 A1* | 8/2020 | Lantela | ............. | B01D 11/0219 |
| 2021/0179967 A1* | 6/2021 | Craig | ..................... | B04C 5/103 |
| 2021/0268401 A1* | 9/2021 | Wirtz | ................ | B01D 11/0273 |
| 2022/0008839 A1* | 1/2022 | Jackson | ............ | B01D 11/0484 |

OTHER PUBLICATIONS

Delta Separations, FFE-45 Falling Film Elevator, USA, pamphlet.
Delta Separations, FFE-60 Falling Film Elevator, USA, pamphlet.
Pinnacle Stainless, SRS 400—Solvent-Recovery Skid, website, USA, URL: https://pinnaclestainless.net/SRS-400.
Precision Extraction Solutions, Ethanol Extraction Equipment, website, USA, URL: https://precisionextraction.com/ethanol-extraction-equipment/.
TRUSTEEL, AV15, cutsheet, USA.
TRUSTEEL, AV30, cutsheet, USA.
TRUSTEEL, AV100, cutsheet, USA.
TRUSTEEL, AV300, cutsheet, USA.

* cited by examiner

CLOSED LOOP EXTRACTION SYSTEM

NOTICE OF COPYRIGHTS AND TRADE DRESS

A portion of the disclosure of this patent document contains material which is subject to copyright or trade dress protection. This patent document may show and/or describe matter that is or may become trade dress of the owner. The copyright and trade dress owner has no objection to the facsimile reproduction by anyone of the patent disclosure, as it appears in the Patent and Trademark Office patent files or records, but otherwise reserves all copyright and trade dress rights whatsoever.

CLAIM OF PRIORITY

This application does not claim priority to any patent or patent application.

FIELD OF THE EMBODIMENTS

The present disclosure relates generally to a closed loop extraction system. More particularly, the present disclosure relates to a closed loop extraction system that is optimized for extracting oils from raw plant matter and processed plant matter.

BACKGROUND

Throughout time, humans have sought to extract various components from plants, such as essence oils, terpenes, and other compounds that occur naturally in various plants. However, with ever-increasing demand for these components, there has become a need to extract these components rapidly, and at scale. While many people have created various solutions to this problem, these systems are often very energy-inefficient, very cost-inefficient, and/or are very time-inefficient.

As such, there is a need for an extraction system which can quickly and efficiently extract desired components from raw plant matter, in a way that is scalable.

It is an object of the present invention to provide an extraction system that can remove desired components from raw plant matter.

It is an object of the present invention to provide an extraction system that can remove desired components from raw plant matter in an energy- and cost-efficient manner.

It is an object of the present invention to provide a method of extracting desired components from raw plant matter.

It is an object of the present invention to provide a method of extracting desired components from raw plant matter in a way that minimizes the cost of performing such a method, while optimizing the yield of said extraction.

The present invention and its embodiments meets and exceeds this objective.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

SUMMARY

An aspect of an example embodiment in the present disclosure is to provide for a closed loop extraction system. In a preferred embodiment, the closed loop extraction system features a chill tank having a first inlet, a first outlet, a first interior volume, and a first high-level setpoint, a wash tank having a second inlet, a second outlet, a second interior volume, and a second high-level setpoint, a rinse tank having a third inlet, a third outlet, a third interior volume, and a third high-level setpoint, and a centrifuge having a rotating mechanism, a basket, a fourth inlet, and a fourth outlet. In this embodiment, the first inlet and the first outlet provide for fluid communication with the first interior volume, the second inlet and the second outlet provide for fluid communication with the second interior volume, the third inlet and the third outlet provide for fluid communication with the third interior volume, and the fourth inlet and the fourth outlet provide for fluid communication with the centrifuge and the basket.

Preferably, the rotating mechanism is configured to rotate the basket when placed within the centrifuge. Additionally, when raw plant matter is to be placed in the centrifuge, it is highly desirable to first place the raw plant matter in a filter bag when it gets inserted into the basket prior to insertion into the centrifuge. The filter bag preferably will have a filtration size in the range of 10 microns to 200 microns, but the filtration size may vary depending on what raw plant matter gets inserted therein, as well as what components of said raw plant matter a user wants to extract.

This embodiment of the closed loop extraction system also features a first pump system, having a first pump, a first valve, a second valve, and a means for the toggleable fluid communication between the first outlet, the second inlet, the third inlet, the first pump, the first valve, and the second valve, a second pump system, having a second pump, a third valve, a fourth valve, and a means for the toggleable fluid communication between the second outlet, the fourth inlet, a third pump system, having a third pump, a fifth valve, a sixth valve, and a means for the toggleable fluid communication between the fourth outlet, the third inlet, the first inlet, the third pump, the fifth valve, and the sixth valve, and a fourth pump system having a fourth pump, a seventh valve, and a means for the toggleable fluid communication between the second outlet, the fourth pump, the seventh valve, and a feed tank configured to receive the solvent.

In various embodiments, the first interior volume of the chill tank is interfaced with a first heat exchanger and/or a first recirculation pump. In other embodiments, the second interior volume of the wash tank is interfaced with a second heat exchanger and/or a second recirculation pump interfaced with the second interior volume. Other embodiments exist where the third interior volume of the rinse tank is interfaced with a third heat exchanger and/or a third recirculation pump.

Preferably, the closed loop extraction system in accordance with the present disclosure is equipped with a means for determining an amount of solvent in the first interior volume, the second interior volume, and/or the third interior volume. The closed loop extraction system in accordance with the present disclosure can optionally include a ventilation system, which is in fluid communication with the chill tank, the wash tank, the centrifuge, the rinse tank, the first pump mechanism, the second pump mechanism, the third pump mechanism, and the fourth pump mechanism. When equipped, a ventilation system is configured to keep the closed loop extraction system in pressure equilibrium. Optionally, the ventilation system may include a collection vessel for collecting any surplus vapors generated by operating said closed loop extraction system. Alternatively, the ventilation system may simply recirculate any vapors or other collected materials back into the closed loop extraction system.

When desired, the closed loop extraction system in accordance with the present disclosure may be fixed on a cart, which preferably has wheels. This will enable an end-user to more easily manipulate and transport the closed loop extraction system within a larger facility, or between multiple facilities.

In a highly preferred embodiment, the closed loop extraction system in accordance with the present disclosure is operated with the assistance of an electronic control system having a processor and memory, where the electronic control system is in electronic communication with the first pump system, the second pump system, the third pump system, the fourth pump system, the temperature regulator, the first heat exchanger, the first recirculation pump, the second heat exchanger, the second recirculation pump, the third heat exchanger, the third recirculation pump. When equipped, the electronic control system, and is configured to selectively control the flow of solvent between the chill tank, the wash tank, the centrifuge, the rinse tank, and the feed tank.

In addition to a closed loop extraction system, the present disclosure also discloses a method of extracting components from raw plant matter through use of such a closed loop extraction system. One embodiment of this method begins by filling the chill tank with the solvent to the first high-level setpoint. The chill tank may be filled with solvent by having the solvent pumped in from an external container filled with the solvent, such as a 55-gallon drum.

After the chill tank has been filled, the solvent contained therein may be chilled to a predetermined temperature, taking into account the materials to be extracted from the raw plant matter, as well as the materials that a user desires to have remain in the raw plant matter. In some embodiments, this temperature is approximately −35° C. Alternatively, the solvent contained in the chill tank may be pumped into the wash tank and the chill tank until each tank reaches its respective high-level setpoint, all three of which are then subsequently cooled to the predetermined temperature.

To perform the method of extracting components from raw plant matter in accordance with the present disclosure, a user must load raw plant matter into the centrifuge. Preferably, the raw plant matter will first be placed in a filter bag, which gets loaded into a basket, which optionally has perforations. The basket then gets placed in an interior chamber of the centrifuge, which gets sealed such that the interior chamber becomes fluid-impermeable.

Once the wash tank and the rinse tank have been filled with solvent to the respective high-level setpoints, and the solvent has cooled to the predetermined temperature, and the centrifuge has been properly loaded with the raw plant matter, an extraction cycle may begin. Preferably, the first extraction cycle begins by pumping solvent from the wash tank into the centrifuge.

Once the centrifuge has been filled with solvent, the raw plant matter is allowed to soak with solvent for a first predetermined amount of time. In various embodiments, this is for a period of 30 seconds to 60 minutes. After the first predetermined amount of time has passed, the solvent is drained from the centrifuge into the wash tank. The centrifuge is then engaged to spin or agitate the raw plant matter to assist in the removal of any solvent absorbed by the raw plant matter. This remainder solvent is then also drained into the wash tank.

The centrifuge is then filled with solvent from the rinse tank, and the raw plant matter is allowed to soak in this solvent for a second predetermined amount of time, which is shorter than the first predetermined amount of time. In some embodiments this amount of time is less than 15 minutes. The solvent is then drained from the centrifuge into the wash tank, and the centrifuge spins or agitates the basket containing the raw plant matter to remove any solvent absorbed by the raw plant matter. The recovered solvent is then drained from the centrifuge into the wash tank, completing one extraction cycle. Preferably, multiple extraction cycles are run, until the solvent contained in the wash tank has reached a desired concentration of the components extracted from the raw plant matter. Upon this being achieved, or upon a user selecting to stop performing extraction cycles, the solvent is pumped from the wash tank into a feed tank. Preferably, a filter is placed in between the wash tank and the feed tank to filter out any solids or semi-solids that may have been collected during an extraction cycle.

In embodiments where the closed loop extraction system used to perform the method is equipped with a ventilation system, embodiments of the method in accordance with the present disclosure exist where extraction cycles are performed with all of the involved components being in pressure equilibrium. There, vapors or other gasses that are collected by the ventilation system may be recirculated into the system, or may be collected in a collection vessel, depending on the embodiment and/or user preference.

The teachings of the present disclosure are closely related to an expired provisional patent filed by application, United States Patent Application No.: 62/758,159, the contents of which are hereby incorporated by reference in their entirety.

Implementations may include one or a combination of any two or more of the aforementioned features.

These and other aspects, features, implementations, and advantages can be expressed as methods, apparatuses, systems, components, program products, business methods, and means or steps for performing functions, or some combination thereof.

Other features, aspects, implementations, and advantages will become apparent from the descriptions, the drawings, and the claims.

While these units may be suitable for the particular purpose employed, or for general use, they would not be as suitable for the purposes of the present disclosure as disclosed hereafter.

In the present disclosure, where a document, act, or item of knowledge is referred to or discussed, this reference or discussion is not an admission that the document, act, item of knowledge, or any combination thereof that was known at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed. It is contemplated that the claims may encompass one or more of the conventional technical aspects discussed herein.

BRIEF DESCRIPTION OF THE PREFERRED EMBODIMENTS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete, and fully conveys the scope of the present disclosure to those skilled in the art. In fact, it will be apparent to those skilled in the art that various modifications and variations can be made in the present invention without departing from the scope or spirit of the invention.

DETAILED DESCRIPTION OF THE PREFERRED EMBODIMENTS

The present disclosure provides for a closed loop extraction system, as it may be implemented to extract plant oil from a variety of raw plant matter and other raw botanicals, both for human consumptions as other industrial applications.

Figure 1:
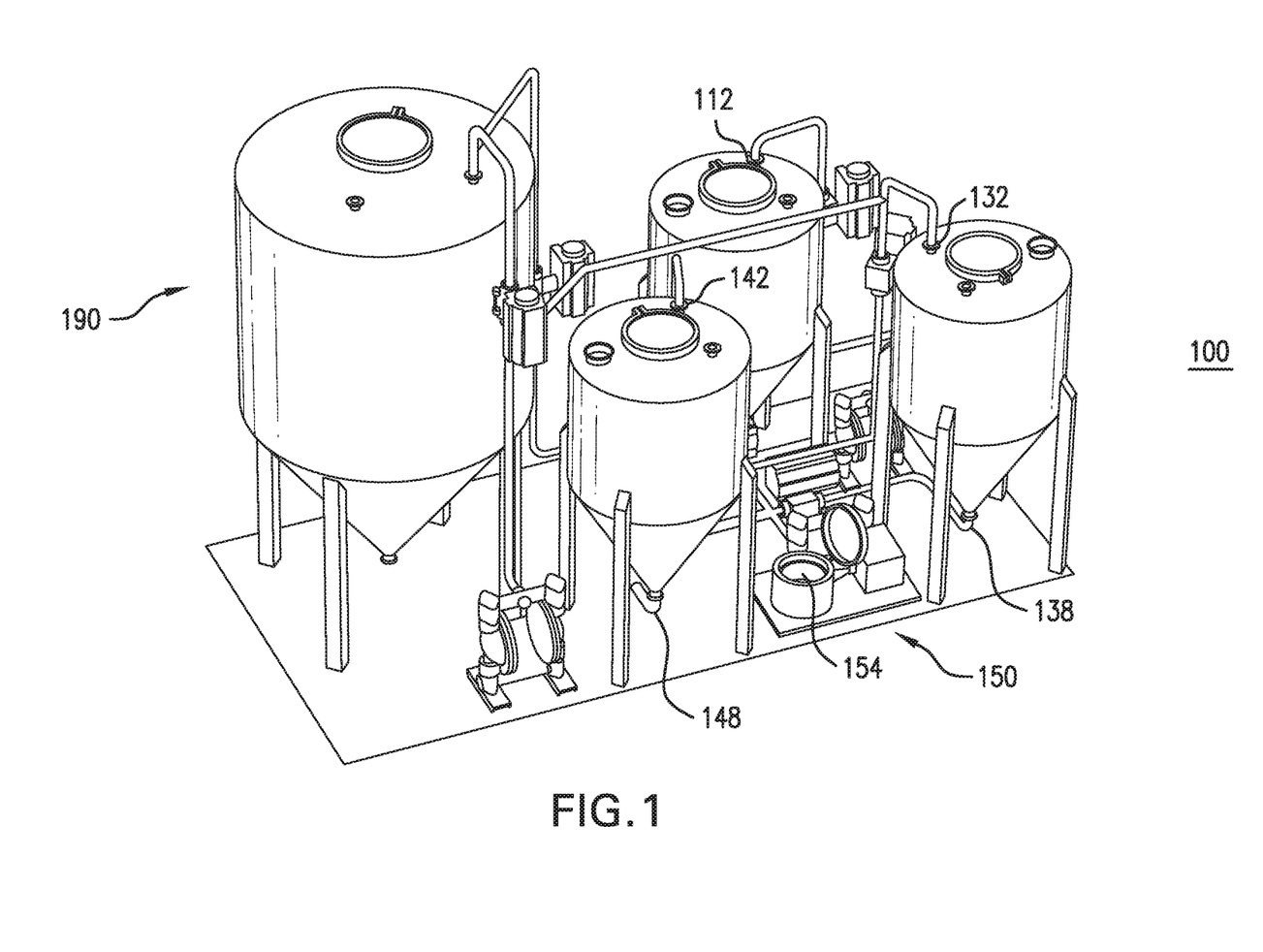
FIG. 1 is a perspective view of an embodiment of the closed loop extraction system in accordance with the present disclosure.
Figure 2:
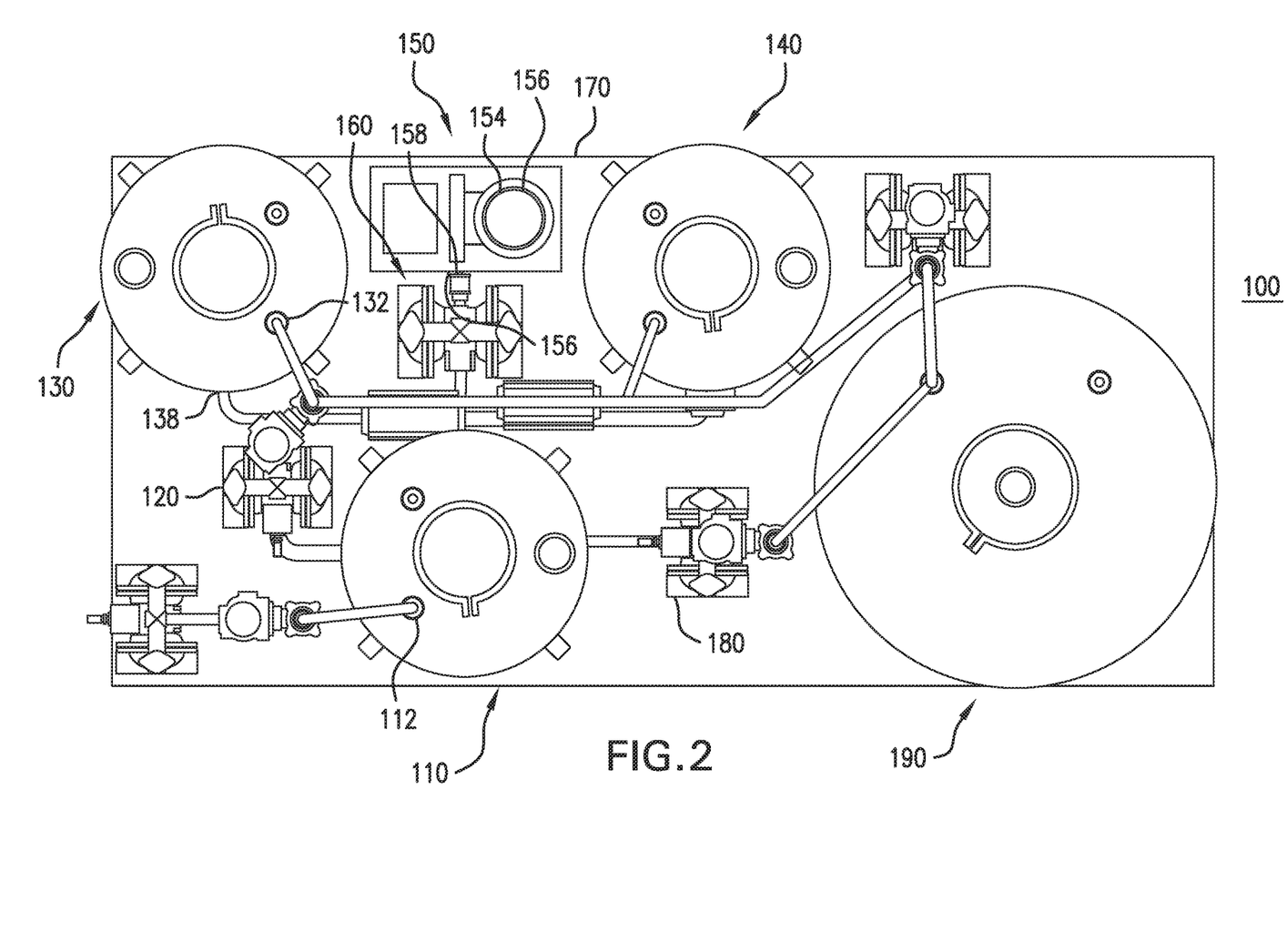
FIG. 2 is a top view of the embodiment of the closed loop extraction system in accordance with the present disclosure, as shown in FIG. 1.

FIGS. 1 and 2 illustrate an embodiment of a closed loop extraction system 100 in accordance with the present disclosure. In this embodiment, the closed loop extraction system 100 features a chill tank 110, a wash tank 130, a rinse tank 140, a centrifuge 150, and a feed tank 190.

The chill tank 110 has a first inlet 112, a first interior volume, a first high-level setpoint 116 (not shown), and first outlet 118, where the first inlet 112 and the first outlet 118 provide for the fluid communication to and from the first interior volume. The wash tank 130 has a second inlet 132, a second interior volume, a second high-level setpoint 136 (not shown), and a second outlet 138, where the second inlet 132 and the second outlet 138 provide for the fluid communication to and from the second interior volume. The rinse tank 140 has a third inlet 142, a third interior volume, a third high-level setpoint 146 (not shown), and a third outlet 148, where the third inlet 142 and the third outlet 148 provide for the fluid communication to and from the third interior volume.

This embodiment of the closed loop extraction system 100 also includes the centrifuge 150 being equipped with a rotating mechanism which is configured to rotate a basket 154 when placed within the centrifuge 150. The centrifuge 150 also includes a fourth inlet 156 and a fourth outlet 158, which together provide for the fluid communication to and from the centrifuge 150, the basket 154, and any raw plant material placed within the basket 154. Preferably, any raw plant material to be placed within the basket 154 will first be placed in a filter bag, having a filtration size in the range of 10 microns to 200 microns.

Also included in this embodiment is a first pump system 120 having a first pump, a first valve 201, a second valve 202, and a means for providing the toggleable fluid communication between the first outlet 118, the second interior volume via the second inlet 132, the third interior volume via the third inlet 142, and the first pump. In some embodiments, this means for toggleable fluid communication is the first valve 201 and/or and the second valve 202 along with one or more pipes.

This embodiment of the closed loop extraction system 100 in accordance with the present disclosure also includes a second pump system 160, which includes a second pump, a third valve 203, a fourth valve 204, and a means for providing for the toggleable fluid communication between the second interior volume via the second outlet 138, and the centrifuge 150 and the basket 154, both via the fourth inlet 156, and the second pump. In some embodiments, this means for toggleable fluid communication is the third valve 203 and/or the fourth valve 204 along with one or more pipes.

Further, this embodiment of the closed loop extraction system 100 includes a third pump system 170 and a fourth pump system 180. The third pump system 170 has a third pump, a fifth valve 205, a sixth valve 206, and a means for providing the toggleable fluid communication between the centrifuge 150 and the basket 154 via the fourth outlet 158, and the third interior volume via the third inlet 142. Here, the means for providing the toggleable fluid communication can be the fifth valve 205 and/or the sixth valve 206 along with one or more pipes. The fourth pump system 180 has a fourth pump, a seventh valve 207, and a means for providing the toggleable fluid communication between the second interior volume via the second outlet 138 and the feed tank 190, preferably via an inlet integrated into the feed tank 190.

In some embodiments, the chill tank 110 is equipped with a tirst heat exchanger and a first recirculation pump, both contained within the first interior volume. In other embodiments, the wash tank 130 is equipped with a second heat exchanger and a second recirculation pump, both contained within the second interior volume. In other embodiments, the rinse tank 140 is equipped with a third heat exchanger and a third recirculation pump, both of which are contained within the third interior volume. Embodiments exist where the closed loop extraction system 100 is equipped with the first heat exchanger, the first recirculation pump, the second heat exchanger, the second recirculation pump, the third heat exchanger, and the third recirculation pump. These embodiments are beneficial because of the increased ability to maintain any solvent contained within the first interior volume, the second interior volume, and/or the third interior volume at a desired temperature.

Other embodiments exist where the closed loop extraction system in accordance with the present disclosure is equipped with a temperature regulator configured to monitor and regulate a temperature within the first interior volume, the second interior volume, and/or the third interior volume, as well as any solvent contained therein. Embodiments exist where the closed loop extraction system is equipped with a means for measuring the amount of solvent (or any other liquid) contained in the first interior volume, the second interior volume, and/or the third interior volume. Such means include a glass-level gauge, a float measuring system, various hydrostatic devices, magnetic-level gauges, capacitance transmitters, and other fluid-level sensors known in the art. Preferably, a solvent recovery system will be in fluid communication with the feed tank in accordance with the present disclosure.

In a highly preferred embodiment, the closed loop extraction system in accordance with the present disclosure is equipped with a ventilation system which is in fluid communication with the chill tank, the wash tank, the centrifuge, the rinse tank, the first pump mechanism, the second pump mechanism, the third pump mechanism, and the fourth pump mechanism. The ventilation system can be configured to provide for the pressure equilibrium between chill tank, the wash tank, the centrifuge, the rinse tank, the first pump mechanism, the second pump mechanism, the third pump mechanism, and the fourth pump mechanism. In some embodiments, the ventilation system is equipped with a collection vessel configured to collect any desired (or undesired) vapors from the closed loop extraction system in accordance with the present disclosure.

In one preferred embodiment, the closed loop extraction system in accordance with the present disclosure is partially or entirely contained on a moveable cart. This allows the closed loop extraction system in accordance with the present disclosure to be easily transported; whether from one location in a facility to a second location, or between multiple facilities.

The present disclosure also contemplates an electronic control system having a processor and a memory, the electronic control system being configured to control the various operations of the closed loop extraction system in accordance with the present disclosure. The electronic control system achieves this functionality be being in electronic communication with the first pump system, the second pump system, the third pump system, the fourth pump system, the temperature regulator, the first heat exchanger, the first recirculation pump, the second heat exchanger, the second recirculation pump, the third heat exchanger, the third recirculation pump. There, the electronic control system is configured to selectively operate these components to performs the various methods of operation of the closed loop extraction system contained herein.

Figure 3:
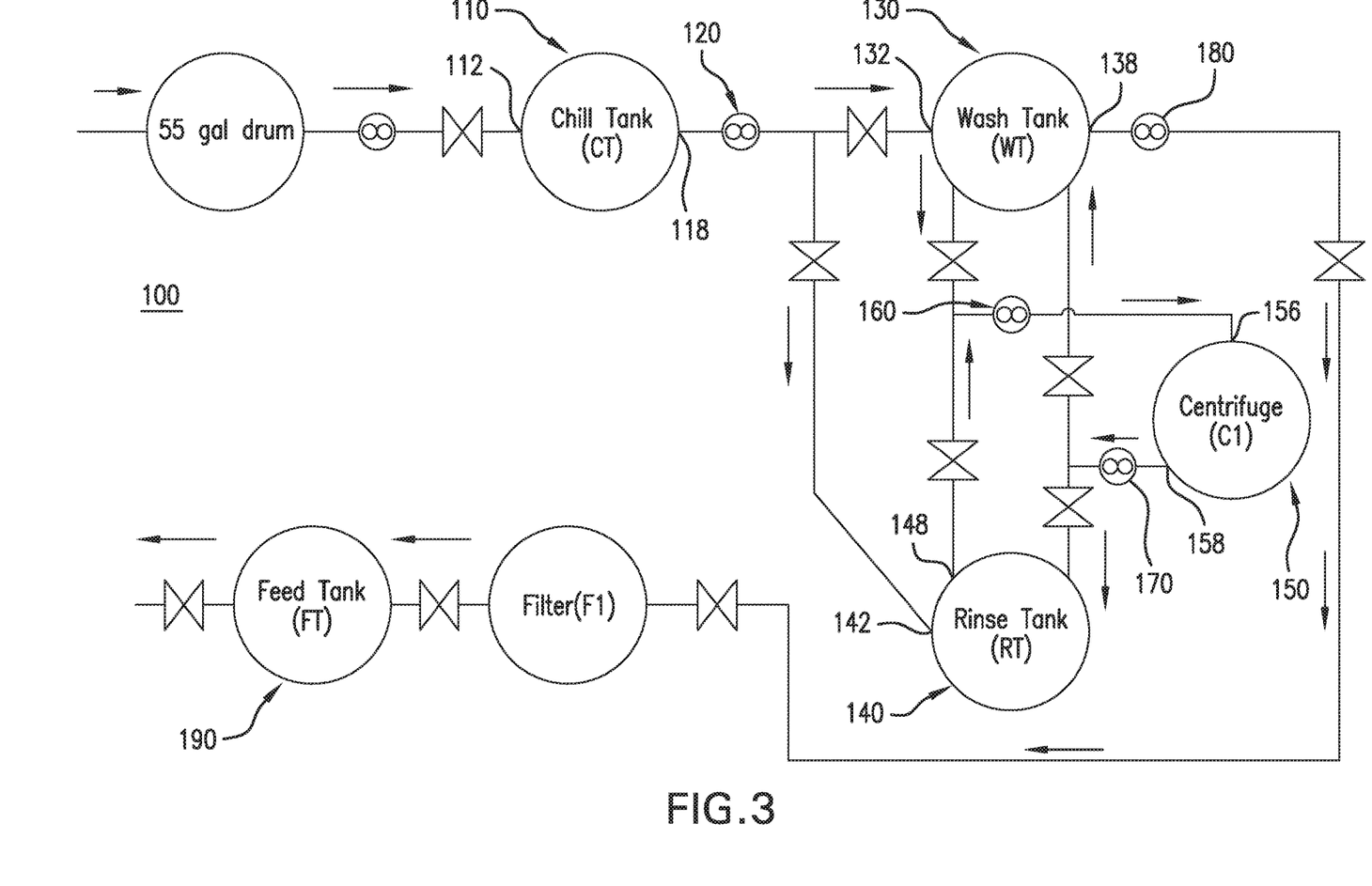
FIG. 3 is a schematic view of a second embodiment of the closed loop extraction system in accordance with the present disclosure.

Referring to FIG. 3, a schematic view of an embodiment of the closed loop extraction system in accordance with the present disclosure is shown to assist with the comprehension of the various components shown and their structural and functional relationship. Specifically, FIG. 3 shows an embodiment of the closed loop extraction system 100 having; the chill tank 110, with the first inlet 112 and the first outlet 118; the wash tank 130 having the second inlet 132 and the second outlet 138; the rinse tank 140 having the third inlet 142 and the third outlet 148; the centrifuge 150 having the fourth inlet 156 and the fourth outlet 158; and the feed tank 190. Also shown in this view is the first pump system 120 having a first pump, a first valve 201, and a second valve 202. The second pump system 160 is also shown having a second pump, a third valve 203, and a fourth valve 204. Further, the third pump system 170 is shown here having a third pump 172, a fifth valve 205, and a sixth valve 206. Finally, the fourth pump system 180 is shown here having a fourth pump and a seventh valve 207.

Preferably, the chill tank 110, the wash tank 130, and the rinse tank 140 are all the same size and are capable of holding the same amount of a liquid such as a solvent, and are in the ranges of 20 gallons to 100 gallons. Also preferably, the feed tank 190 is preferably 2.5 times the size of the chill tank 110, the wash tank 130, and/or the rinse tank 140.

In various embodiments, the chill tank 110, the wash tank 130, and the rinse tank 140 have an outer shell and an interior volume, which are preferably constructed of SUS304 stainless steel, where the outer shell has a thickness of 1.5 mm, and the interior volume is a container having a thickness of 3 mm. Optionally, the chill tank 110, the wash tank 130, and the rinse tank 140 may be equipped with a glycol cooling jacket having a capacity of 1 to 3 gallons. In some embodiments, the chill tank 110, the wash tank 130, and the rinse tank 140 are insulated with a material such as polyurethane, which preferably has a thickness of 80 mm.

The various components of the closed loop extraction system in accordance with the present disclosure may be interfaced with or comprise a variety of connections, such as a pressure/vacuum relief valve (PVRV), a multi-zone coolant inlet/outlet, a PT100 interface, a sample valve, TC top-mounted manway, a carb stone, a separate blow-off pipe, a rotatable racking arm with a DIN fitting, an analog temperature gauge, an analog Pressure Gauge, and/or oversized yeast dump port. Some embodiments of the closed loop extraction system in accordance with the present disclosure include an air compressor configured to provide 20 to 80 CFM at 90 psi.

The present disclosure also contemplates various methods of use for the closed loop extraction system in accordance with the present disclosure. In one embodiment of the method, the method begins by a user must load raw plant matter into the centrifuge. Preferably, the raw plant matter will first be placed in a filter bag, which gets loaded into a basket, which optionally has perforations. The basket then gets placed in an interior chamber of the centrifuge, which gets sealed such that the interior chamber becomes fluid-impermeable. It should be noted that vastly improved results are achieved when the plant matter is not placed in the center of the centrifuge. In order to achieve the g-forces required by the present disclosure, raw plant matter should be placed near the peripheral of the basket to take advantage of the additional centrifugal force exerted thereon.

Once the wash tank and the rinse tank have been filled with solvent to the respective high-level setpoints, and the solvent has cooled to the predetermined temperature, and the centrifuge has been properly loaded with the raw plant matter, an extraction cycle may begin. Preferably, the first extraction cycle begins by solvent being pumped from the wash tank and into the centrifuge.

Once the centrifuge has been filled with solvent, the raw plant matter is allowed to soak with solvent for a first predetermined amount of time. In various embodiments, this is for a period of 30 seconds to 60 minutes. After the first predetermined amount of time has passed, the solvent is drained from the centrifuge into the wash tank. The centrifuge is then engaged to spin or agitate the raw plant matter to assist in the removal of any solvent absorbed by the raw plant matter. This remainder solvent is then also drained into the wash tank. Of note here is that the centrifuge operates at a multiple of g-forces as opposed to RPM. While of course a spinning centrifuge is spinning with a certain RPM, the g-force generated by the centrifuge is the relevant metric. In a preferred embodiment, the centrifuge is configured to apply g-forces on the raw plant material loaded into the centrifuge in the range of 1000 to 1300. However, this range may vary depending on the density of the raw plant matter used. Preferably, 98%+ of the solvent contained in the raw plant matter will be removed through the use of the centrifuge.

The centrifuge is then filled with solvent from the rinse tank, which will be less saturated with the desired extraction components than the solvent that just left the centrifuge. The raw plant matter is allowed to soak in this solvent for a second predetermined amount of time, which is shorter than the first predetermined amount of time. In some embodiments this amount of time is less than 15 minutes. The solvent is then drained from the centrifuge into the wash tank, and the centrifuge spins or agitates the basket containing the raw plant matter to remove any solvent absorbed by the raw plant matter. The recovered solvent is then drained from the centrifuge into the wash tank, completing one extraction cycle. Preferably, multiple extraction cycles are run, until the solvent contained in the wash tank has reached a desired concentration of the components extracted from the raw plant matter. Upon this being achieved, or upon a user selecting to stop performing extraction cycles, the solvent is pumped from the wash tank into a feed tank. Preferably, a filter is placed in between the wash tank and the feed tank to filter out any solids or semi-solids that may have been collected during an extraction cycle.

In many embodiments, ethanol or chilled ethanol serves as the solvent, although the choice of solvent will ultimately depend on the raw plant material, the compounds to be extracted from the raw plant materials, the compounds not to be extracted from the raw plant material, and the relative solubilities in various solvents thereof. In some embodiments, the method is performed at atmospheric pressure within the components of the closed loop extraction system, however the system can also operate at pressure levels above or below atmospheric pressure, depending on the desired extraction to be performed. Preferably, the method is performed at temperatures between −35° C. and −45° C. Colder operating temperatures are contemplated by the present disclosure, as are operating temperatures substantially equal to room temperature (STP). Controlling the temperature of the operation of said closed loop extraction system will assist with keeping undesirable components such as fats and waxes out of the feed tank.

In various embodiments, multiple extraction cycles can be performed without emptying the feed tank or replacing the raw plant matter inserted into the centrifuge. In embodiments where the closed loop extraction system in accordance with the present disclosure is equipped with a ventilation system, the ventilation system may be used to collect all solvent vapors that are generated by the operation of said closed loop extraction system.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," and "third," are used herein to describe various elements, components, regions, layers and/or sections, these elements, components, regions, layers and/or sections should not be limited by these terms. These terms are only used to distinguish one element, component, region, layer and/or section from another element, component, region, layer and/or section. Thus, a "first element," "component," "region," "layer" and/or "section" discussed below could be termed a second element, component, region, layer and/or section without departing from the teachings herein.

Features illustrated or described as part of one embodiment can be used with another embodiment and such variations come within the scope of the appended claims and their equivalents.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

In conclusion, herein is presented a closed loop extraction system. The disclosure is illustrated by example in the drawing figures, and throughout the written description. It should be understood that numerous variations are possible while adhering to the inventive concept. Such variations are contemplated as being a part of the present disclosure.

What is claimed is:

1. A closed loop extraction system, comprising:
a chill tank having a first inlet, a first outlet, a first interior volume, and a first high-level setpoint,
wherein the first inlet and the first outlet provide for fluid communication with the first interior volume, a wash tank having a second inlet, a second outlet, a second interior volume, and a second high-level setpoint,
wherein the second inlet and the second outlet provide for fluid communication with the second interior volume;

a rinse tank having a third inlet, a third outlet, a third interior volume, and a third high-level setpoint, wherein the third inlet and the third outlet provide for fluid communication with the third interior volume:

a centrifuge having a rotating mechanism, a basket, a fourth inlet, and a fourth outlet,
wherein the rotating mechanism is configured to rotate the basket within the centrifuge, and
wherein the fourth inlet and the fourth outlet provide for fluid communication with the centrifuge and the basket:

a first pump system in fluid communication with the chill tank, the wash tank, and the rinse tank, having a first pump, a first valve configured to control fluid communication between the first outlet and the second inlet, a second valve configured to control fluid communication between the first outlet and the third inlet and a means for toggling fluid communication between the first outlet and the second inlet via the first valve, and between the first outlet and the third inlet via the second valve;

a second pump system in fluid communication with the wash task, the rinse tank, and the centrifuge, having a second pump, a third valve configured to control fluid communication between the second outlet and the fourth inlet, a fourth valve configured to control fluid communication between the third outlet and the fourth inlet, and a means for toggling fluid communication between the second outlet and the fourth inlet via the third valve, and between the third outlet and the fourth inlet via the fourth valve:

a third pump system in fluid communication with the wash tank, the rinse tank, and the centrifuge, having a third pump, a fifth valve configured to control fluid communication between the fourth outlet and the second inlet, a sixth valve configured to control fluid communication between the fourth outlet and the third inlet, and a means for toggling fluid communication between the fourth outlet and the second inlet via the fifth valve, and between the fourth outlet and the third inlet via the sixth valve: and a fourth pump system in fluid communication with the wash tank and a feed tank configured to receive a solvent, having a fourth pump, a seventh valve configured to control fluid communication between the second outlet and the feed tank, and a means for toggling fluid communication between the second outlet.

2. The closed loop extraction system of claim 1, the chill tank further comprising a first heat exchanger interfaced with the first interior volume and a first recirculation pump interfaced with the first interior volume.

3. The closed loop extraction system of claim 2, the wash tank farther comprising a second heat exchanger interfaced with the second interior volume and a second recirculation pump interfaced with the second interior volume.

4. The closed loop extraction system of claim 3, the rinse tank further comprising a third heat exchanger interfaced with the third interior volume and a third recirculation pump interfaced with the third interior volume.

5. The closed loop extraction system of claim 4, further comprising a temperature regulator configured to monitor and regulate a temperature within the first interior volume, the second interior volume, and/or the third interior volume.

6. The closed loop extraction system of claim 5, further comprising a solvent recovery system in fluid communication with the feed tank.

7. The closed loop extraction system of claim 6, further comprising a means for determining an amount of solvent in the first interior volume, the second interior volume, and/or the third interior volume.

8. The closed loop extraction system of claim 7, further comprising a ventilation system in fluid communication with the chill tank, the wash tank, the centrifuge, the rinse tank, the first pump system, the second pump system, the third pump system, and the fourth pump system, wherein the ventilation system is configured to keep the closed loop extraction system in pressure equilibrium.

9. The closed loop extraction system of claim 8, the ventilation system being configured to recirculate any collected materials back into the closed loop extraction system.

10. The closed loop extraction system of claim 8, the ventilation system further comprising a collection vessel.

11. The closed loop extraction system of claim 1, wherein said closed loop extraction system is contained entirely on a cart.

12. The closed loop extraction system of claim 9, further comprising an electronic control system having a processor and a memory, wherein the electronic control system is in electronic communication with the first pump system, the second pump system, the third pump system, the fourth pump system, the temperature regulator, the first heat exchanger, the first recirculation pump, the second heat exchanger, the second recirculation pump, the third heat exchanger, and the third recirculation pump, and
wherein the electronic control system is configured to selectively control a flow of solvent between the chill tank, the wash tank, the centrifuge, the rinse tank, and the feed tank.

13. The closed loop extraction system of claim 12, further comprising a filter bag placed within the basket, wherein the filter bag has a filtration size in the range of 10 microns to 200 microns.

14. The closed loop extraction system of claim 13, farther comprising a cart fixed to the chill tank, the wash tank, the rinse tank, the centrifuge, the ventilation system, the first pump system, the second pump system, and the third pump system.

15. A method of extracting components from raw plant matter through the use of a closed loop extraction system having;
a chill tank having a first inlet, a first outlet, a first interior volume, and a first high-level setpoint, the first inlet and the first outlet providing for fluid communication with the first interior volume;
a wash tank having a second inlet, a second outlet, a second interior volume, and a second high-level setpoint, the second inlet and the second outlet providing for fluid communication with the second interior volume, and a second high-level setpoint, the second inlet and the second outlet providing for third communication with the second interior volume;
a rinse tank having a third inlet, a third outlet, a third interior volume, and a third high-level setpoint, the third inlet and the third outlet providing for fluid communication with the third interior volume;
a centrifuge having a rotating mechanism, a basket, a fourth inlet, and a fourth outlet, the rotating mechanism being configured to rotate the basket within the centrifuge, the fourth inlet and the fourth outlet providing for fluid communication with the centrifuge and the basket;
a first pump system in fluid communication with the chill tank, the wash tank, and the rinse tank, having a first pump, a first valve configured to control fluid communication between the first outlet and the second inlet, a second valve configured to control fluid communication between the first outlet and the third inlet, and a means for toggling fluid communication between the first outlet and the second inlet via the first valve, and between the first outlet and the third inlet via the second valve;

a second pump system in fluid communication with the wash tank, the rinse tank and the centrifuge, having a second pump, a third valve configured to control fluid communication between the second outlet and the fourth inlet, a fourth valve configured to control fluid communication between the third outlet and the fourth inlet, and a means for toggling fluid communication between the second outlet and the fourth inlet via the third valve, and between the third outlet and the fourth inlet via the fourth valve;

a third pump system in fluid communication with the wash tank, the rinse tank and the centrifuge, having a third pump, a fifth valve configured to control fluid communication between the fourth outlet and the second inlet, a sixth valve configured to control fluid communication between the fourth outlet and the third inlet, and a means for toggling fluid communication between the fourth outlet and the second inlet via the fifth valve, and between the fourth outlet and the third inlet via the sixth valve; and a fourth pump system in fluid communication with the wash tank and a feed tank configured to receive a solvent, having a fourth pump, a seventh valve configured to control fluid communication between the second outlet and the feed tank, and a means for toggling fluid communication between the second outlet and the feed tank, comprising the steps of:

a. filling, by the electronic control system, the chill tank with the solvent to the first high-level setpoint;
b. filling, by the first pump mechanism, the wash tank with the solvent to the second high-level setpoint, and the rinse tank with the solvent to the third high-level setpoint;
c. chilling, by the temperature regulator, the chill tank, the wash tank, and the rinse tank to a predetermined temperature;
d. inserting a raw plant material into the basket;
e. placing the basket in the centrifuge to interface the basket with the rotating mechanism;
f. filling, by the second pump system, the centrifuge with solvent from the wash tank;
g. allowing the raw plant material to soak in the solvent for a first predetermined amount of time;
h. draining, by the third pump system, the solvent from the centrifuge into the wash tank;
i. rotating, by the rotating mechanism, the basket to remove solvent contained in the raw plant material;
j. draining, by the third pump system, the solvent from the centrifuge into the wash tank;
k. filling, by the second pump system, the centrifuge with solvent from the rinse tank;
l. allowing the raw plant material to soak in the solvent for a second predetermined amount of time, wherein the second predetermined amount of time is smaller than the first predetermined amount of time;
m. draining, by the third pump system, the solvent from the centrifuge into the wash tank;
n. repeating steps f-m for an amount of cycles: and
o. delivering, by the fourth pump system, solvent from the wash tank into the feed tank.

16. The method of claim 15, wherein the predetermined temperature is −35° C.

17. The method of claim 16, the first predetermined amount of time being in the range of 30 seconds to 60 minutes.

18. The method of claim 17, the second predetermined amount of time is less than 15 minutes.

19. The method of claim 18, the fourth pump system further comprising a filter configured to capture solids and semi-solids, the filter being in fluid communication with the fourth pomp system and being disposed between the seventh valve and the feed tank.

20. The method of claim 14, the closed loop extraction system further comprising a ventilation system in fluid communication with the child tank, the wash tank, the centrifuge, the rinse tank, the first pump system, the second pump system, the third pump system, and the fourth pump system, the ventilation system being configured to keep the closed loop extraction system in pressure equilibrium, wherein steps a-o are performed with the closed loop extraction system being in pressure equilibrium.

* * * * *